UNITED STATES PATENT OFFICE.

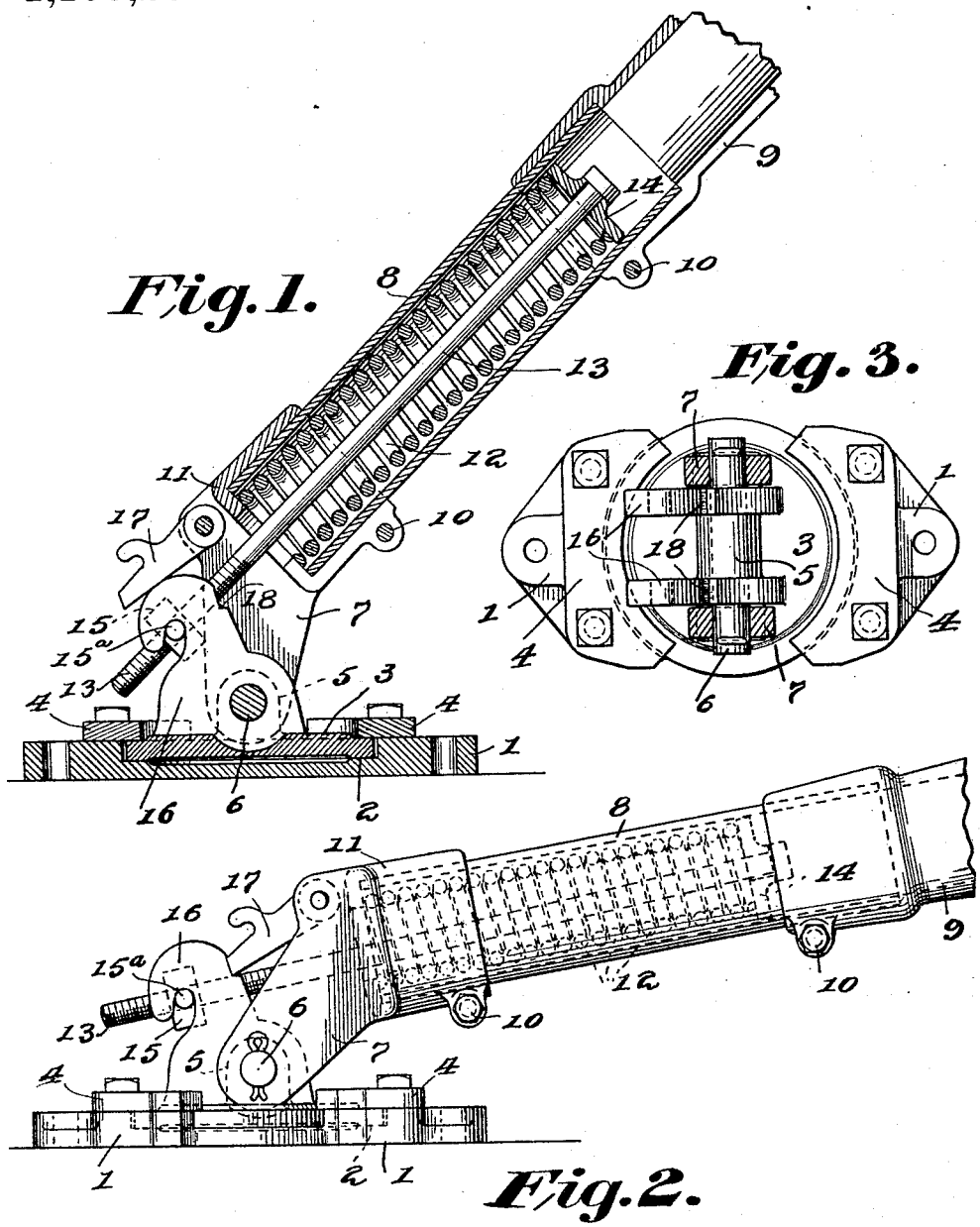

NILS D. LEVIN, OF COLUMBUS, OHIO, ASSIGNOR TO THE JEFFREY MANUFACTURING COMPANY, OF COLUMBUS, OHIO, A CORPORATION OF OHIO.

TROLLEY MECHANISM.

1,199,283.   Specification of Letters Patent.   Patented Sept. 26, 1916.

Original application filed March 5, 1909, Serial No. 481,525. Divided and this application filed January 20, 1915. Serial No. 3,386.

*To all whom it may concern:*

Be it known that I, NILS D. LEVIN, a citizen of the United States, residing at Columbus, in the county of Franklin and State of Ohio, have invented certain new and useful Improvements in Trolley Mechanism, of which the following is a specification, reference being had therein to the accompanying drawings.

This invention relates to improvements in trolley arms for mine locomotives and in the devices for attaching them to, and supporting them on, the vehicle.

The object is to provide a trolley construction which will be simple and composed of few parts, and have no exposed parts to project to any material distance from the axis of vibration; which, second, will have the horizontal axis of the trolley arm in the lowest possible plane, and yet permit it to swing freely around a vertical axis and freely around the said low horizontal axis, to allow the locomotive to be taken into mine entries with low roofs; which, third, will have a stiff rigid rod to transmit the spring tension, this rod entering the lower end of the trolley arm and extending into a chamber therein, and having its lower end accessible at any time for detaching the trolley pole or for adjusting the spring, the spring being seated in said chamber in the lower end of the arm so that it is entirely concealed and to prevent it from catching pieces of coal, slate, or other foreign objects; and the rod which engages with the free or relatively movable upper end of the spring being threaded at its lower end to carry the pivoting, spring-holding and spring-adjusting device.

In the drawings—Figure 1 shows one embodiment of my invention and is a cross-sectional elevation through the trolley support and lower part of the trolley arm; Fig. 2 is a side elevation showing the trolley arm located in its lower position; Fig. 3 is a plan view of the base, a cross section being taken through the bearing of the trolley arm.

Referring to the drawings, 1 indicates a thin bearing plate which is bolted to the top of a locomotive.

2 is a circular bearing seat formed in the bearing plate 1. The bearing disk 3 is formed to engage the bearing seat 2 with a free working fit. The clips 4 are provided to hold the bearing disk 3 in position. The disk 3 is provided with a boss 5 through which extends a bearing pin 6.

The trolley arm consists of a forked bracket 7 with a split socket at its upper end, together with a split tubular socket 9 to receive the wheel carrying pole, and a tube 8 which is rigidly secured to the sockets 9 and 7. It is shown as inserted into these sockets and clamped tightly by bolts at 10. The lower forked bracket 7 has an aperture in each of its prongs through which passes the aforesaid hinge pin 6. The socket part of this bracket has a central aperture surrounded by a flange at 11. The coil spring 12 lies in the tube and at its lower end engages with the flange 11. 13 is a rod which extends through the tube 8 through the coil spring 12 and is connected with the spring at its upper end by means of the washer 14. The rod is threaded at its lower end and carries the nut 15 which has transversely extending circular pivots or trunnions $15^a$. The bearing disk 3 has two parallel lugs 16 which have hooks near their upper parts which engage the trunnions $15^a$ of the nut 15.

When the trolley arm and support is assembled the nut 15 is adjusted in place on the rod 13. The spring is compressed and its expansive force is transmitted through the rod 13 to the lugs 16 of the base. The action of the spring thus tends to throw the trolley arm upward into operative position and the effective force of the spring may be adjusted by changing the position of the nut 15.

The pawl 17 is pivotally mounted on the bearing piece 7 and is so positioned that it will automatically drop into the notches 18 of the lugs 16 when the trolley arm is drawn into its lower position, thus locking the arm.

The base plate 1 is thin and flat; the disk plate 3 is still thinner and lies entirely within the seat 2 in the plate 1, this disk serving as a horizontal hinge element for permitting free movement of the trolley arm around a vertical axis. The hinge pin 6 has its axis in the lowest horizontal line permitted by the required strength of the parts. The forks of the hinge bracket 7 are short as are also the swinging lugs 16.

The rod 13 extends as a rigid unit through the spring, the greater part of the rod and all of the spring being inclosed within the trolley arm tube 8.

The rod provides a support for the adjusting device which is exposed for immediate access and yet has no materially projecting parts, the lower end of the rod being adapted to swing freely in the space allowed above the flat bottom plates. When the pole is in upright position, or nearly so, as in Fig. 1, the tension of the spring is largely reduced and the nut 15 with its pivots 15$^a$ can be easily drawn out from the hooks on the abutment lugs 16. Such removal is required when it is desired to vary the spring tension or to remove the trolley arm from the car. The latter is frequently done as the mine locomotives are provided with attaching plates 1 and 3 on both the right-hand side and the left-hand side to permit the proper relating of the locomotive to a trolley wire which is arranged, not centrally of the track system but, at one side in the low-roofed entries. This obviates the reversal of the vehicle on the track.

When the pole is down the parts at the hinged end all lie below a plane five or six inches from the top surface of the locomotive.

The rod 13 which extends, as aforesaid, as a rigid unit from the holder at 15, 15$^a$, to the upper end of the spring, I have found to have many advantages over a flexible device such as a section of wire cable which I have heretofore used, and which is shown and described in my co-pending application 481,525, filed March 5, 1909.

What I claim is:

1. A trolley arm and mounting mechanism for a mine locomotive having, in combination, a thin horizontally rotary bearing plate with a horizontal hinge element immediately above said plate, the vertically short hinge bracket secured to said hinge element, the tube carried by said bracket and rigidly supporting the upper part of the trolley arm, the spring inclosed within the said tube, the abutting device on the rotary plate, the rod extending as a rigid unit from the upper end of the spring with which it engages to the abutting device, and means adjustable along the rod for detachably connecting it pivotally to the abutting device above the plate.

2. A trolley arm and mounting mechanism for a mine locomotive having, in combination, a thin horizontally rotary bearing plate with a horizontal hinge element in a plane immediately above said plate, the vertically short hinge bracket secured to said hinge element, the abutting device on the rotary plate, the tube carried by said bracket and rigidly supporting the upper part of the trolley arm, the spring inclosed within the said tube, the rod extending through the spring and connected thereto at its upper end and having its lower end threaded, and the nut adjustably engaging with the lower end of the rod and pivotally and detachably engaging with the said abutting device.

3. A trolley arm and mounting mechanism for a mine locomotive having, in combination, a thin horizontally rotary bearing plate with a horizontal hinge element immediately above said plate, the hinge bracket secured to said hinge element, the tube carried by said bracket and rigidly supporting the upper part of the trolley arm, the spring inclosed within the tube, the rod extending through the spring, the abutting device on the rotary plate, means adjustable along the rod for detachably and pivotally connecting it to the abutting device, and the automatically acting stop moving with the trolley arm and adapted to positively engage with the abutting device when the trolley arm is depressed.

In testimony whereof, I affix my signature, in presence of two witnesses.

NILS D. LEVIN.

Witnesses:
  E. P. SNIVELY,
  DUDLEY T. FISHER.